(12) United States Patent
Micai

(10) Patent No.: US 6,213,274 B1
(45) Date of Patent: Apr. 10, 2001

(54) TRACTION ELECTROMECHANICAL DEVICE WITH FREE RETURN UPON DE-ENERGIZING

(75) Inventor: Claudio Micai, Itu (BR)

(73) Assignee: Emicol Eletro Elecronica Ltda. (BR)

( * ) Notice: Subject to any disclaimer, the term of this patent is extended or adjusted under 35 U.S.C. 154(b) by 0 days.

(21) Appl. No.: 09/398,864

(22) Filed: Sep. 20, 1999

(30) Foreign Application Priority Data

Sep. 21, 1998 (BR) .................................. PI9805273

(51) Int. Cl.⁷ ............................ D06F 37/00; F16D 11/04
(52) U.S. Cl. ................... 192/143; 192/69.8; 192/93 R; 68/12.24
(58) Field of Search ....................... 192/143, 138, 192/142 R, 69.8, 93 R; 68/12.24; 318/468; 477/11, 12

(56) References Cited

U.S. PATENT DOCUMENTS

| | | | |
|---|---|---|---|
| 2,625,248 | * | 1/1953 | Geldhof et al. ............... 192/93 R X |
| 2,963,159 | * | 12/1960 | Stone ........................... 68/12.24 X |
| 3,576,117 | * | 4/1971 | Cowan et al. ................. 192/93 R X |

* cited by examiner

*Primary Examiner*—Richard M. Lorence
(74) *Attorney, Agent, or Firm*—Volpe and Koenig, P.C.

(57) ABSTRACT

A device simulating the action of a solenoid, wherein the displacement of a shaft 6 is controlled by a reducer 5 driven by a motor 10 through a coupling 4. The coupling is controlled by a small solenoid 2, through an actuator 3, the energizing of which is obtained in parallel with said motor 10.

8 Claims, 3 Drawing Sheets

TRACTION ELECTROMECHANICAL DEVICE WITH FREE RETURN UPON DE-ENERGIZING

The present invention refers to an electromechanical device that performs a mechanical traction action in the energized condition and allows the inverse, return action upon de-energizing thereof. In other words, the present invention refers to an electromechanical device that simulates the operation of a solenoid.

There are several possibilities for utilization of such a device, and, as a non-limiting reference, it will be described in the use thereof for the brake control system of garment washing machine vats; however, it should be clearly understood that the utilization of such a device is much broader in scope.

By way of example, and within the illustrative application field in question, among the several parts comprising garment washing machines is the vat brake system. According to the prior art, such system is basically comprised of a braking element, generally a non-elastomeric belt, which surrounds a portion projecting from said vat and actuated by a respective actuation mechanism provided with a spring. In turn, the belt has one end thereof fixed, whereas the other end is attached through said spring to a braking device so that, when the device is deactivated, said belt is forced against the projecting portion of the vat by action of said spring, thereby causing the latter's rotation by reason of the friction created between the belt and the projecting portion of the vat.

Among the devices known in the state of the art, we emphasize a widely employed one, which is based on the energizing of a solenoid. Accordingly, when said device is de-energized, the solenoid's armature, acting on said spring and thus indirectly on said belt, brakes the vat. Therefore, the braking condition is maintained for as long as the solenoid's armature is not being powered and, on the other hand, the brake is released upon energizing thereof.

The mechanisms employed to brake the vat, as shown, may be by action of a belt or by other means, such as those based on brake shoes acting on a specific portion of the vat, or the shaft thereof, either directly or through clamps, etc.

On the other hand, the actuation devices of these various known systems are always based on a large-sized solenoid, the armature of which is connected through said actuation spring to a belt, a brake shoe or a brake clamp.

However, the use of large solenoids is not without drawbacks. The first one lies in the noise created upon actuation of the solenoids, which for less informed people gives the impression that the equipment is malfunctioning or the like. On the other hand, the power consumption of said solenoids is not irrelevant, and the same applies to the total cost of such a device, which is mainly due to the cost of the solenoid itself.

Accordingly, it is an object of the present invention to provide an electromechanical actuating device capable of overcoming the drawbacks of the described art.

It is also an object of the present invention to provide an electromechanical device capable of being employed in lieu of large sized solenoids, by utilization of smaller sized, less energy consuming solenoids.

More particularly, it is an object of the present invention to provide a traction electromechanical device with free return, comprising:

an actuating shaft mechanically coupled to a reducer which in turn is connectable to a motor by means of a coupling;

a solenoid the armature of which is attached to a first end of the actuator and the opposite end of which is attached to a spring, said opposite end being provided with a ramp;

a coupling comprised of a lower crown and an upper crown, the lower portion of the upper crown and the upper portion of the lower crown being provided with a cooperating relief, said lower crown being slidable along the coupling shaft; and electrical power leads electrically directly connected to a solenoid, and electrically connected to the motor by means of a switch the metallic shaft of which is displaced in accordance with the shaft's position.

The object of the present invention will be best understood in the light of the following description, with reference to the appended drawings, shown by way of illustration only and not as limiting the scope of the invention, wherein.

Figure 1:
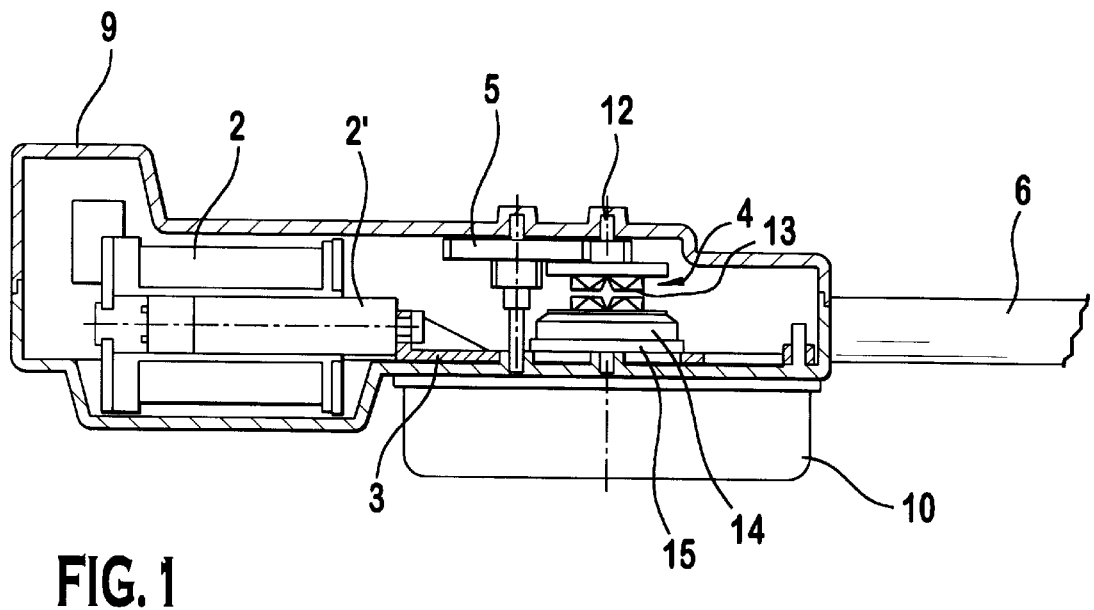
FIG. 1 is an upper elevation view of the device of the present invention, in the uncoupled position.

In accordance with the appended figures, 1 generally indicated the electromechanical traction device subject matter of the present invention. Said device 1 is inserted in a box 9, and externally thereto is attached a motor 10, from which protrudes an actuation shaft 6.

Said device is comprised of a solenoid 2 attached to box 9, and an armature 2' projects from the latter. Said armature 2' is attached to an actuator 3, which slides longitudinally in relation to box 9.

The actuator is basically a centrally hollowed bar-shaped element provided with means for attachment to the solenoid armature 2' on one side and comprising a ramp 3' on the opposite end thereof. In addition, said actuator 3 is attached to a side or box 9 by means of a spring 11.

Through the center of the hollow portion of actuator 3 projects the shaft 12 of coupling 4. Said coupling is comprised of an upper, first crown 13 fixed in relation to said shaft 12 and a lower, second crown 14, longitudinally movable on said shaft 12. The lower portion of crown 13 and the upper portion of crown 14 are provided with cooperating reliefs. In addition, lower crown 14 is provided on the lower portion thereof with a disc 15 that contacts shaft 10' of motor 10, and also a projection 18 that slides over the actuator 3, particularly on its ramp 3'.

The upper crown 13 contacts a reducer 5 which in turn acts on the teeth 6' of actuation shaft 6.

Said actuation shaft 6 comprised on one end thereof, internally to box 9, a series of teeth 6', in addition to a lateral contact projection 17. The shaft 6 is internally hollow, so as to slide on a guide pin 16. On the opposite end (not illustrated), said shaft 6 is provided with appropriate attachments, hinges or any other mechanical connection means, in order to, for example, support a braking belt, connect a mechanical hinge or generate a controlled actuation movement by any other means.

Laterally to said shaft 6 is provided a switch 7, the metallic stem 7' of which is centrally provided with a V-shaped projecting portion, which interacts with said contact projection 17 of shaft 6.

The switch 7 is electrically powered by means of feed leads 8 which, depending on the position of said switch 7, energize motor 10, through respective power cables. On the other hand, solenoid 2 is directly connected to leads 8, so that the energizing of said leads causes the immediate energizing of said solenoid 2.

In operation, as already said, in the non-limiting incorporation of the invention, in particular for utilization in the control of garment washing machine brakes, when, for example, the washing stage is commenced, the garment washing machine control central (not illustrated) sends a signal to the device of the invention, so as to release the rotation of the vat (not illustrated).

Figure 2:
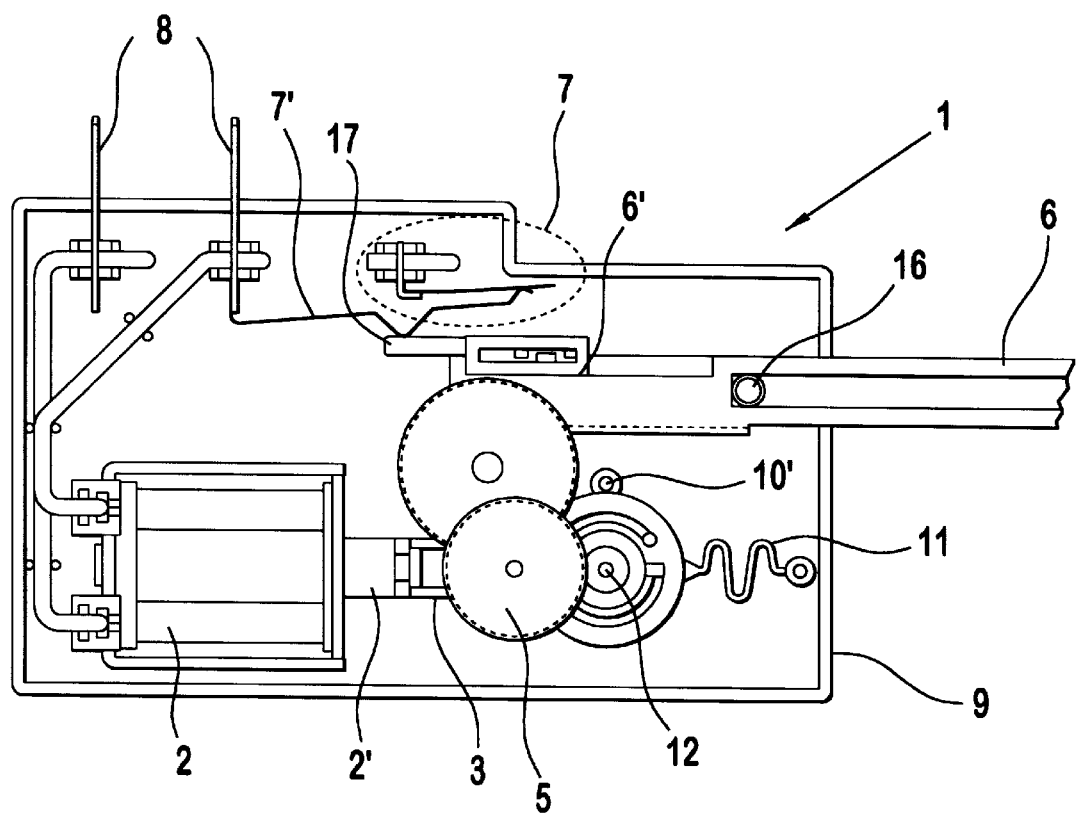
FIG. 2 is a lateral cross-section, along the line II—II of FIG. 1.
Figure 3:
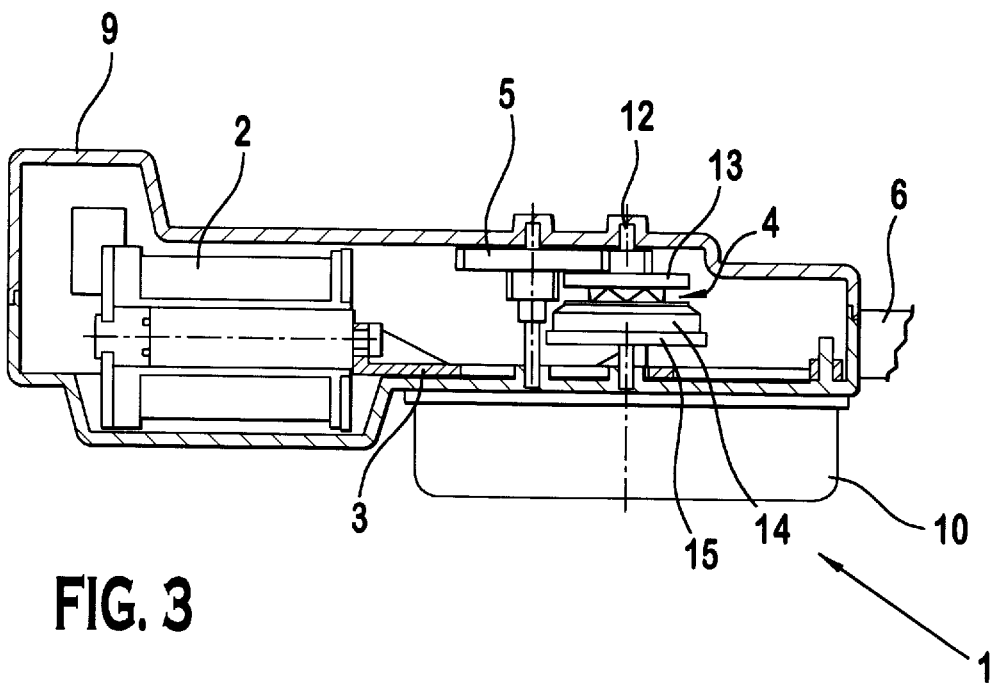
FIG. 3 is a view similar to FIG. 1, in the coupled position.
Figure 4:
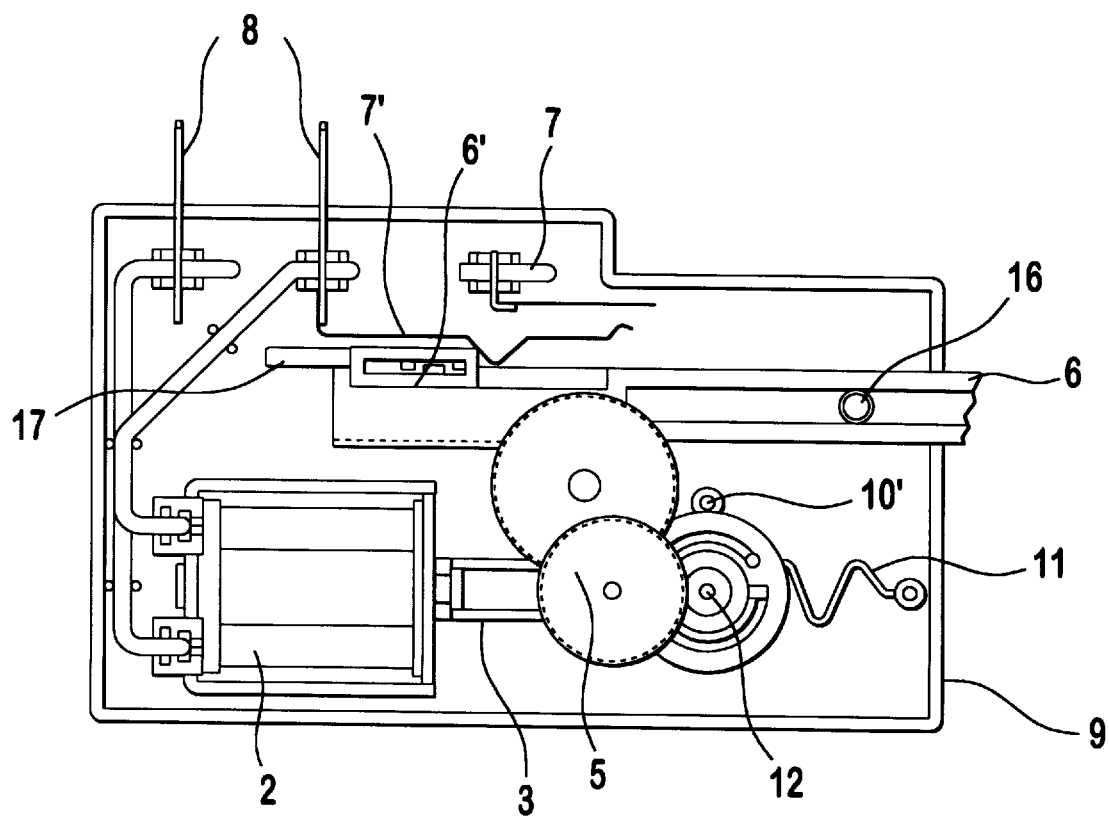
FIG. 4 is a cross-section view of FIG. 3, along line IV—IV of FIG. 3.
Figure 5:
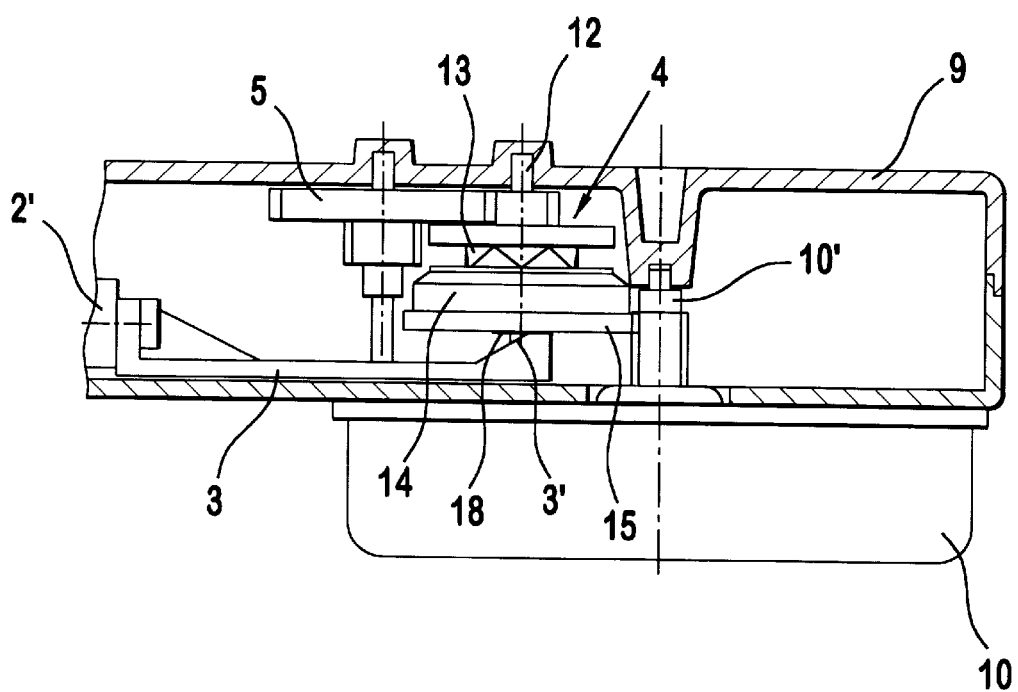
FIG. 5 is a schematic view of the coupling's operation.

The device, in this situation before start of washing (that is, uncoupled, as shown on FIGS. 1 and 2) has the shaft 6 thereof entirely projected outward, that is, no force is applied against the spring action on the vat brake belt, which remains braked. In this condition, the lateral projection 17 of stem 6 maintains the metallic element 7' displaced against the switch 7, so as to allow the flow of current from leads 8 to motor 10, while solenoid 2 is directly connected to lead 8.

Accordingly, in order to start the washing operation, it is necessary to release the vat's rotary movement, which is obtained by energizing the power leads 8.

Said motor 10 and solenoid 2 being thus electrically powered, motor 10 starts its rotating movement through its shaft 10', whereby lower crown 13 of coupling 4 also starts to turn.

At the same time, upon energizing of solenoid 2, the armature of solenoid 2' retracts, thereby displacing actuator 3, against the action of spring 11.

Upon displacement of actuator 3, the ramp of actuator 3' acts on the lower projection 18 of lower crown 14, thereby causing the latter to be displaced upwards on shaft 12. Such displacement is progressive and takes place until the solenoid's armature is fully contracted. In this condition, ramp 3' of actuator 3 fully displaces lower crown 14 upwards and, accordingly, maintains said lower crown 14 coupled to upper crown 13, by means of their cooperating relief surfaces.

Since crown 14 rotates as a function of the rotation movement of shaft 10' of motor 10, such rotation is transmitted to upper crown 13, which in turn transmits said rotation movement to reducer 5. In the same manner, such rotation causes the displacement of shaft 6, by interaction between the last gear of reducer 5 and teeth 6' of shaft 6.

Accordingly, the shaft contracts in relation to box 9, in opposition to the force generated by the spring on the vat brake belt, which then releases said vat's rotary movement.

The displacement of shaft 6 remains for as long as the contact between the metallic stem 7' of switch 7 and the lateral projection 17 of shaft 6 persists. Starting from a certain degree of retraction of shaft 6, the metallic stem 7' loses the support of the V-shaped portion of the lateral projection 17 of shaft 6 and, accordingly, the flow of electric current to motor 10 is interrupted. At this time, the motor stops operating and, therefor, shaft 6 ceases its retraction movement.

On the other hand, and since solenoid 2 remains energized, the physical contact of coupling 4 remains and, thus, any movement of shaft 6 is only allowed upon respective rotation of motor 10, through reducer 5.

In accordance with tests performed, the motor's rotational inertia, multiplied by the reducing factor of reducer 5, is sufficient to prevent any movement of extension or retraction of shaft 6.

When such brake becomes necessary, for example, at the end of the centrifuging stage or after washing of the garments, the control unit of the garment washing machine de-energizes the lead 8 of the invention's device and, in particular, solenoid 2 is de-energized. In this situation, and by action of spring 11, the actuator 3 is pulled, so as to project armature 2' of solenoid 2 outward and, thus, displace actuator 3, thereby uncoupling the coupling 4, that is, lowering the lower crown 14, to release the latter from physical engagement with upper crown 13.

Upon release of coupling 4, shaft 6 loses its mechanical engagement with motor 10 and, thus, can easily return to the extended position, that is, it ceases to act upon the spring of the vat braking system, whereby said belt starts braking the vat again, by action of said spring.

As can be seen from the above description, the device of the present invention is quite versatile and safe, thereby allowing a smooth and efficient braking action on the washing machine's vat, according to the non limiting incorporation shown.

In addition, said device presents several other advantages. Initially, it stands out for its safe and silent operation, thereby preventing the drawbacks of the prior art, described in relation to the brakes actuated by solenoids only. In this case, and since the solenoid employed has a much smaller dimension in relation to those employed in the prior art, the total cost of the device of the invention is smaller.

On the other hand, the dimensions of actuation shaft 6 can vary according to the need, which allows the utilization of the device of the invention in a broad range of systems and mechanisms. In particular, such device can be employed in replacement of conventional, large-sized solenoids, with great advantages. Among these advantages, we can cite a decrease in electric power consumption to maintain the device in the retracted condition, since that in this condition only a small solenoid is fed, whereas the motor acts as a passive resistance to any movement of shaft 6 of the device.

In addition, and even though not illustrated, the switch 7 can be assembled in a movable manner, so as to allow the displacement thereof from a maximum position to a minimum position. In this case, the regulation of its position allows to control the maximum and minimum displacement of shaft 6, which is not possible with the devices of the prior art.

In particular, the control of displacement of shaft 6 can be obtained by means of a switch provided with a pin extending outward of box 9. In this case, said switch should be displaced between two extreme positions, such displacement being controlled by said external control pin. Another incorporation provides an entirely straight metallic stem 7', without said V-shaped projection. In this case, an electric contact also controlled by an external pin can slide over said metallic stem 7'. In either case, the control pin is displaced between the metallic stem 7' and the lateral projection 17, the interaction of which, as seen, controls the stop of shaft 6.

Finally, it should be understood that construction variants can be made without departing from the scope of the present invention, as defined on the following claims. In particular, elements can be replaced by constructive or operational equivalents thereof. For example, solenoid 2 can be replaced by an element controlling the displacement of actuator 3, or shaft 6 can be directly or indirectly attached to the system on which the invention operates.

What is claimed is:

1. Traction electromechanical device with free return, characterized in that it comprises:
   an actuation shaft, mechanically coupled to a reducer which in turn is engageable to a motor by means of a coupling;
   a solenoid, including an armature which is attached to a first end of an actuator, an opposite end of said actuator is attached to a spring, said opposite end being provided with a ramp;

a coupling comprised of a lower crown, an upper crown and a coupling shaft, the lower portion of said upper crown and the upper portion of said lower crown being provided with a cooperating relief, and said lower crown being slidable along the coupling shaft; and feed leads electrically connected to said solenoid, in a direct manner, and electrically connected to said motor by means of a switch, the switch including a metallic stem which is displaceable in accordance with the position of said actuation shaft.

2. Device in accordance with claim 1, characterized in that said actuation shaft is displaced over a guide pin and is provided with teeth arranged on the inner end of said actuation shaft.

3. Device in accordance with claim 1, characterized in that said actuation shaft is provided laterally of its end inwardly of a box with a lateral contact projection acting on said metallic stem of said switch.

4. Device in accordance with claim 3, characterized in that said lateral contact projection acts on a V-shaped projection of said metallic stem of said switch.

5. Device in accordance with claim 3, characterized in that said lateral contact projection acts on a movable contact arranged on the metallic stem of said switch.

6. Device in accordance with claim 1, characterized in that said motor is provided with an externally toothed transmission shaft that cooperates with a disc of said lower crown of said coupling.

7. Device in accordance with claim 1, characterized in that said actuator has a laminar, centrally hollow shape, one of the ends thereof being attached to the armature of said solenoid, whereas the opposite end has an ascending ramp shape extending from the central portion of the actuator towards the opposite end of said actuator, said ramp acting under a projection of said lower crown, so as to displace said crown on said coupling shaft, from a higher position engaged to said upper crown to a lower position disengaged from said upper crown.

8. Device in accordance with claim 2, characterized in that said actuation shaft is provided laterally of its end inwardly of a box with a lateral contact projection acting on said metallic stem of said switch.

* * * * *